United States Patent
Kasztenny et al.

(10) Patent No.: US 6,442,010 B1
(45) Date of Patent: Aug. 27, 2002

(54) DIFFERENTIAL PROTECTIVE RELAY FOR ELECTRICAL BUSES WITH IMPROVED IMMUNITY TO SATURATION OF CURRENT TRANSFORMERS

(75) Inventors: Bogdan Z. Kasztenny, Markham; Ara Kulidjian, Toronto, both of (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/542,543

(22) Filed: Apr. 3, 2000

(51) Int. Cl.$^7$ .................................................. H02H 3/00
(52) U.S. Cl. ............................ 361/63; 361/78; 361/87; 361/93.1
(58) Field of Search .............................. 361/45, 35, 38, 361/87, 115, 93.1, 78, 62, 64, 66, 42, 63

(56) References Cited

U.S. PATENT DOCUMENTS

| | | | |
|---|---|---|---|
| 3,573,552 A | * 4/1971 | Forfod | 317/18 |
| 3,633,071 A | * 1/1972 | Fendt et al. | 317/26 |
| 3,974,423 A | * 8/1976 | Ulyanitsky et al. | 317/26 |
| 4,237,512 A | * 12/1980 | Forford | 361/87 |
| 4,502,086 A | * 2/1985 | Ebisaka | 361/87 |
| 4,623,949 A | * 11/1986 | Salowe et al. | 361/63 |
| 4,670,811 A | * 6/1987 | Eda | 361/45 |

OTHER PUBLICATIONS

International Search Report dated Nov. 02, 2001 for Application No. PCT/US/10748, filed Apr. 03, 2001.

Schuster, N. et al., "Advaptiver Differentialschutz Fuer Industrienetze", Elektrotechnische Zeitschrift—Etz. VDE Verlag GMBH. Berlin, DE, vol. 120, No. 13/14, Jul. 1999, pp. 16–20, XP000919982.

Hosemann, G. et al., "Modal Saturation Detector For Digital Differential Protection", IEEE Transactions On Power Delivery, IEEE Inc., vol. 8, No. 3, Jul. 1, 1993, pp. 933–940, XP000403086.

* cited by examiner

*Primary Examiner*—Stephen W. Jackson
(74) *Attorney, Agent, or Firm*—Karl Vick; Jonathan D. Link; Hunton & Williams

(57) ABSTRACT

A differential protective relay and method for a microprocessor-based bus differential protective relay that ensures fast and sensitive operation under internal fault conditions and offers improved stability during external fault and other non-internal fault conditions. The method uses a two-slope differential characteristic to cope with small CT transformation errors without reducing relay sensitivity. The method can also use a saturation detector to switch dynamically between the 1-out-of-2 and 2-out-of-2 operating mode depending whether or not the CTs saturate. In a 2-out-of-2 operating mode, both the differential and directional elements must confirm a fault for the relay to trip. In a 1-out-of-2 mode, if saturation is not detected, the relay can trip without checking the fault direction.

37 Claims, 12 Drawing Sheets

DIFFERENTIAL PROTECTIVE RELAY FOR ELECTRICAL BUSES WITH IMPROVED IMMUNITY TO SATURATION OF CURRENT TRANSFORMERS

BACKGROUND OF THE INVENTION

The invention generally relates to protection of power system busbars from internal faults (short-circuits). More particularly, the present invention improves relay's sensitivity to internal faults and stability under external faults by detecting saturation of Current Transformers (CTs) and applying extra security measures to prevent malfunction of the protective relay upon detecting the saturation.

Power system busbars are electrical nodes that interconnect a plurality of circuits such as transmission lines, transformers and generators. Consequently, busbars are connected to a number of energy sources that all together can produce enormous fault current in the event of a short circuit on a busbar (an internal fault for the busbar relay) or in a near vicinity of the busbar (an external fault for the busbar relay). Large magnitude of the fault current imposes demanding requirements on the speed of operation of busbar relays. At the same time, large currents associated with near external faults may saturate one or more CTs causing problems for the busbar protective relay. Busbars can be protected from internal faults by detecting faults internal to the protected busbar and initiating trip command to appropriate Circuit Breakers (CBs). The CBs subsequently disconnect the defective busbar from all the connected circuits in order to minimize further damage to the involved electrical equipment and the power system as a whole.

The busbar protection is typically accomplished using a differential protection principle. With reference to FIG. 1, the CTs are used to measure the currents in all the circuits connected to the busbar. Locations of the CTs define a "zone" of protection for the bus. The currents are then compared and the unbalance (differential) current is produced as an algebraic sum of all the input currents. In an ideal operation of the CTs, the differential signal equals zero during normal load conditions and external faults, while it equals the fault current during internal faults; a simple threshold would enable the relay to distinguish between internal and external faults in such ideal circumstances.

As a practical matter, however, the CTs operate accurately only up to certain magnitude of their primary currents. If the primary current becomes too large and/or it contains slowly decaying dc (direct current) component(s), the CT becomes saturated and the secondary current is no longer an accurate indicator of the primary current. The errors introduced by the saturated CTs create as a spurious differential current during external faults. This may cause malfunction of the differential relay during external fault conditions.

To prevent relay malfunction due to CT saturation either the so called "high impedance bus differential" or "low impedance biased (percentage) bus differential" principle is used.

A high impedance bus differential relay typically uses a special stabilizing resistor to create a high impedance path for the differential current. If one of the CTs saturates, its magnetizing branch has a much lower impedance relative to the effective input impedance of the relay and majority of the spurious differential signal flows through the saturated CTs, not through the relay. This prevents malfunction during external faults.

A low impedance biased bus differential relays use a special reference (restraining) current to detect excessive differential current and initiate tripping. The restraining signal is created to reflect the external fault current. The differential current is not compared against a fixed threshold (unbiased differential) but against the restraining signal (biased or percentage differential). The comparison uses operate/no-operate regions on the differential current - restraining current in a two-dimensional plane. Such a differential characteristic is typically shaped by a constant pick-up threshold and two or more slopes and breakpoints.

In addition, other means of stabilizing the relay during external faults are known. They include harmonic restraint or direct analysis of the waveform of the differential current, linear couplers or gapped transformers, CT saturation detection, and currents from the periods of saturation-free operation. Such solutions doe not provide adequate sensitivity, reliability, and/or protection against malfunctions.

BRIEF SUMMARY OF THE INVENTION

The present invention overcomes the problems noted above, and provides other solutions, by providing, in exemplary embodiments, a method and system for a microprocessor-based bus differential protective relay that ensures fast and sensitive operation under internal fault conditions and offers improved stability during external fault and other non-internal fault conditions.

According to one embodiment, the method uses a two-slope differential characteristic to cope with small CT transformation errors without reducing relay sensitivity. The second (higher) slope is produced by a straight line crossing the origin of the differential-restraining two-dimensional plane. Thus, the slope provides a true percentage (proportional) restraint across all the restraining currents. The discontinuity between the first (lower) and second (higher) slopes is removed by a special transition (joining) line of the characteristic.

The maximum of all the input currents is used to produce the restraining signal for the differential characteristic.

The method can also include a two-stage software-based saturation detector that is capable of detecting saturation of one or more current transformers during external faults. The saturation detector triggers only on external faults and is capable of detecting saturation that happens as soon as approximately 2 milliseconds past the inception of the fault.

The method can also use a current directional principle for better stability on external faults. A set of currents having the highest magnitude is selected during a given fault and the angular relations between those currents and the sums of all the remaining currents are checked. If at least one of the currents is flowing out of the protected busbar as compared with the direction of the sum of the remaining currents, the external fault case is declared and the relay is inhibited.

The method can also use a saturation detector to switch dynamically between the 1-out-of-2 and 2-out-of-2 operating mode depending whether or not the CTs saturate. In a 2-out-of-2 operating mode, both the differential and directional elements must confirm a fault for the relay to trip. In a 1-out-of-2 mode, if saturation is not detected, the relay can trip without checking the fault direction.

The differential characteristic can be divided into two sub-regions, a lower region operating in the fixed 2-out-of-2 mode, and an upper region operating on the 2-out-of-2 basis if CT saturation is detected.

BRIEF DESCRIPTION OF THE DRAWINGS

The present invention and its resulting advantages can be more fully understood by reading the following Detailed Description in conjunction with the accompanying drawings, in which.

DETAILED DESCRIPTION OF THE INVENTION

Figure 1:
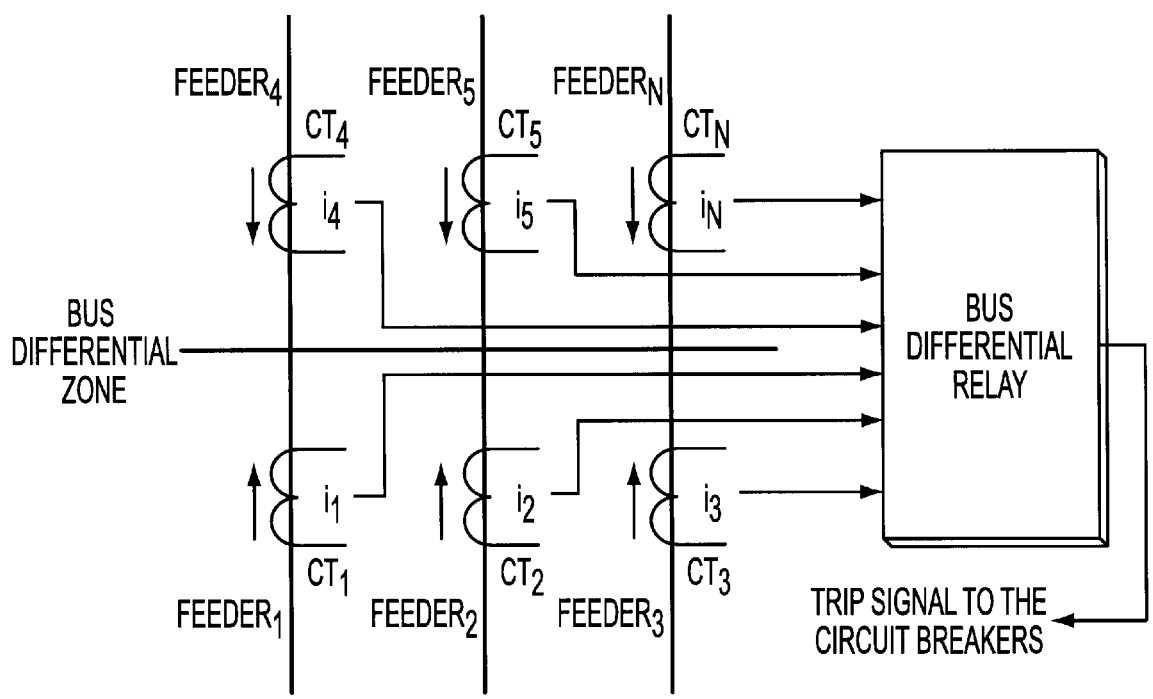
FIG. 1 shows an arrangement of a differential relay protecting a power system busbar.

In the following description, the symbols listed below are used.

A. CONSTANTS AND INDICES

N—number of feeders (circuits) defining the boundary of a bus differential zone $N_1$—number of samples per power system cycle (one particular implementation uses $N_1$=64)

P—number of samples per protection pass (one particular implementation uses P=8, "protection pass" is a software cycle for executing the logic part of the presented algorithm)

$f_1$—nominal system frequency (50 or 60 Hz)

a—sampling period in radians $T_1$—time delay for the saturation detector to return from the "EXTERNAL FAULT" state to the "NORMAL" state $T_2$—time delay for the saturation detector to return from the "EXTERNAL FAULT & CT SATURATION" state to the "EXTERNAL FAULT" state $T_3$—security time delay for the directional principle k—circuit index (k=1 . . . N)

p—contributor index n—protection pass index m—sample index $C_1$, $C_3$, $S_{LH}$—auxiliary constants

B. SIGNALS $i_{k(m)}$—instantaneous value (sample) of the mimic-filtered current in the k-th circuit at the sample m $I_{k(m)}$—phasor of the current in the k-th circuit at the protection pass n $I_{D(n)}$—phasor of the differential current at the protection pass n $I_{R(n)}$—magnitude of the restraining current at the protection pass n $i_{D(m)}$—instantaneous value of the differential current at the sample m $i_{R(m)}$—instantaneous value of the restraining current at the sample m $M_{D(n)}$—"magnitude" of the instantaneous value of the differential current at the protection pass n $M_{R(n)}$—"magnitude" of the instantaneous value of the restraining current at the protection pass n $\Delta i_{R(n)}$—rate of change of the instantaneous value of the restraining current at the protection pass n $x_{(m)}$, $y_{(m)}$—auxiliary signals used to calculate $\Delta i_{R(n)}$ at the sample m $\phi_{p(n)}$—angle between the p-th contributor and the remaining currents of the differential zone at the protection pass n $DIF_L$—flag indicating that the differential-restraining point ($I_D$,$I_R$) is located in the region denoted as $DIF_1$ $DIF_H$—flag indicating that the differential-restraining point ($I_D$,$I_R$) is located in the region denoted as $DIF_2$ DIF—flag indicating the differential-restraining point ($I_D$, $I_R$) is located in the region denoted as differential characteristic SAT—flag indicating CT saturation SC—flag indicating CT saturation condition $SC_{fast}$—flag indicating CT saturation condition as detected by the fast (sample based) principle $SC_{slow}$—flag indicating CT saturation condition as detected by the slow (phasor based) principle DIR—flag indicating operation of the directional protection principle $DIF_{UNB}$—flag indicating operation of the unbiased differential protection $DIF_{BIASED}$—flag indicating operation of the biased differential protection

C. SETTINGS $D_0$—differential characteristic: pick-up $D_1$—differential characteristic: unbiased operation threshold $S_L$—differential characteristic: first (lower) slope $S_H$—differential characteristic: second (higher) slope $B_L$—differential characteristic: first (lower) breakpoint $B_H$—differential characteristic: second (higher) breakpoint $A_{LIM}$—directional characteristic: limit angle Referring now to FIG. 2 a block diagram of an implementation of the bus differential technique of the present invention is shown. The method and system of FIG. 2 will be described using the terms "functional block" and "comparator." It will be understood that these elements can be implemented in a wide variety of ways, including hardware components and software instructions encoded on a machine-readable storage medium formatted to be read and executed by a microprocessor-based protective relay.

Figure 2:
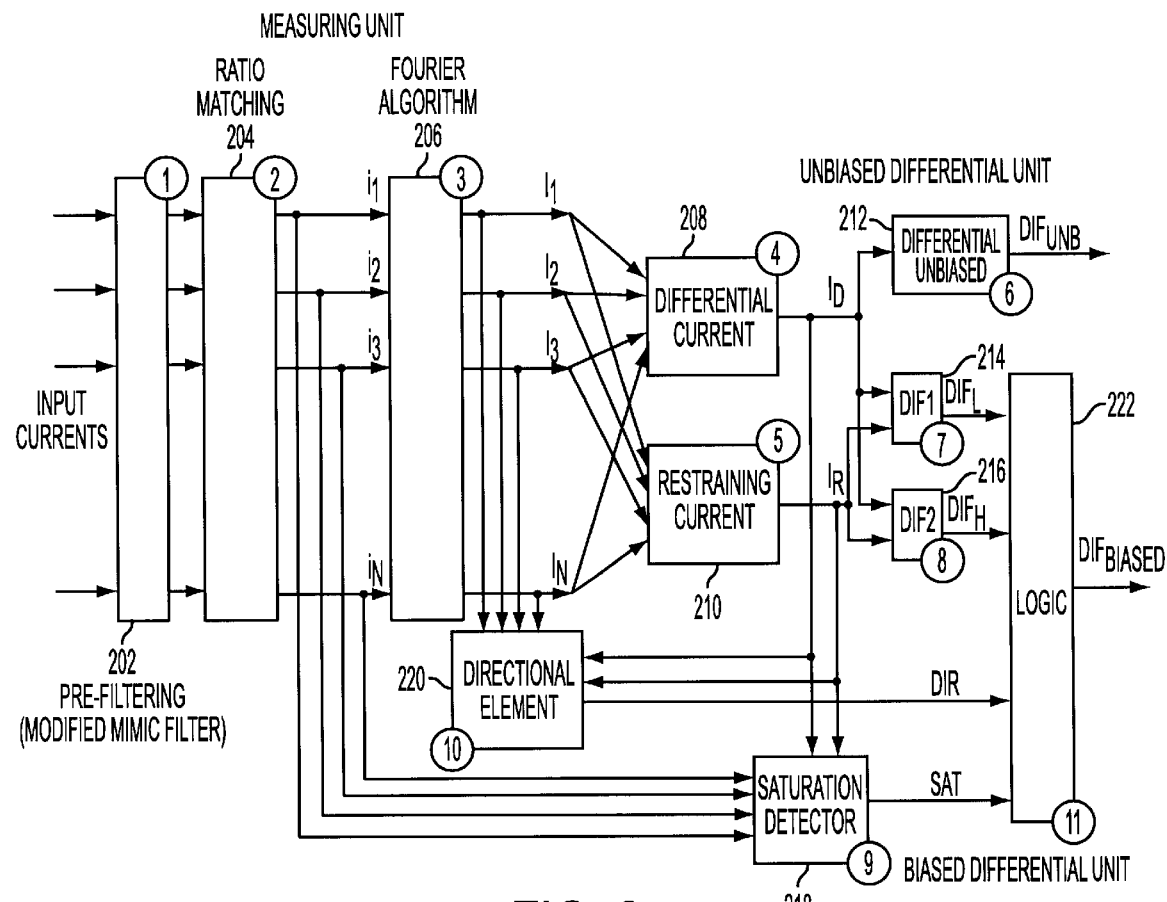
FIG. 2 depicts an overall block diagram of an exemplary method implementing the present invention.

Further, it is to be understood that a microprocessor-based protective relay is well-known as an intelligent protective relay incorporating a suitably-programmed digital microprocessor for providing protective control of power systems. h In FIG. 2, input currents defining the bus differential zone ($i_1$ . . . $i_N$, received by the protective relay from current transformers associated with the power system) are prefiltered using a digital mimic filter 202 to remove decaying dc components and other signal distortions. The currents are measured in the unified direction with respect to the bus, i.e., either into or from the bus.

The filtered input signals are ratio matched taking into account the transformation ratios of the connected CTs in functional block 204. In step 204, samples of the currents are brought to a common scale as the instantaneous differential and restraining signals are determined by the algorithm.

A functional block 206 receives the ratio-matched input current signal samples and generates (e.g., by applying a Fourier algorithm to the input signals) a corresponding plurality of phasor values.

The current phasor values are used to calculate the differential signals in functional block 208 and restraining signals in functional block 210 in a manner to be described in more detail below.

The magnitude of the differential signal is compared with a threshold of an unbiased differential characteristic in comparator 212 and the $DIF_{UNB}$ flag is produced.

The magnitude of the differential signal is compared with the restraining signal using the $DIF_1$ and $DIF_2$ characteristics in comparators 214 and 216, respectively. As a result, the flags $DIF_L$ and $DIF_H$ are set respectively.

The magnitudes of the differential and restraining currents as well as currents samples are used by a saturation detector 218 to set the saturation flag SAT.

A directional element 220 uses the current phasors as well as the phasor of the differential current and the restraining current to produce the flag DIR.

The five flags produced by functional blocks 212, 214, 216, 218 and 220 are combined by logic block 222. The flag indicating operation of the biased bus differential element is set by the logic block 222.

The entire algorithm is preferably applied on a per phase basis, such that no information is shared between the phases. The phase index is omitted in this description except with respect to the examples of relay operation (FIGS. 13–19).

The individual elements and steps of FIG. 2 will now be discussed in more detail. In functional block 208, the differential signal is calculated as:

$$I_D = \sum_{k=1}^{N} I_k \quad (1)$$

Equation (1) is executed every protection pass.

Although the differential-restraining characteristic requires the magnitude of the differential signal alone, the differential current phasor must be calculated as used by the directional element (functional block 220).

In functional block 210, the restraining signal is calculated as:

$$I_R = \max_{k=1 \ldots N} (|I_k|) \quad (2)$$

Equation (2) is executed every protection pass.

The "maximum of[|P|]" definition of the restraining quantity (versus the "sum of") is preferred for at least two reasons. First, it provides more sensitivity and increases the speed of operation during internal faults. Second, contribution of the differential characteristic to relay stability during external faults that saturate the CTs is of a secondary importance as the protection algorithm detects CT saturation and uses the 2-out-of-2 operating principle if saturation occurs.

The magnitude of the phasor (versus the true RMS value that provides more security during external faults saturating the CTs) is preferred for at least two reasons. First, the combination of the true RMS value (for the restraining signal) and the phasor magnitude (for the differential signal) may cause missing operation during single infeed conditions and heavy CT saturation. Second, contribution of the differential characteristic to relay stability during external faults that saturate the CTs is of a secondary importance as the protection algorithm detects CT saturation and uses the 2-out-of-2 operating principle if saturation occurs.

In comparator 212, the operation of the unbiased differential overcurrent principle is indicated by the $DIF_{UNB}$ flag set as follows:

$$DIF_{UNB} = |I_D| > D_1 \quad (3)$$

Equation (3) is executed every protection pass.

Figure 3:
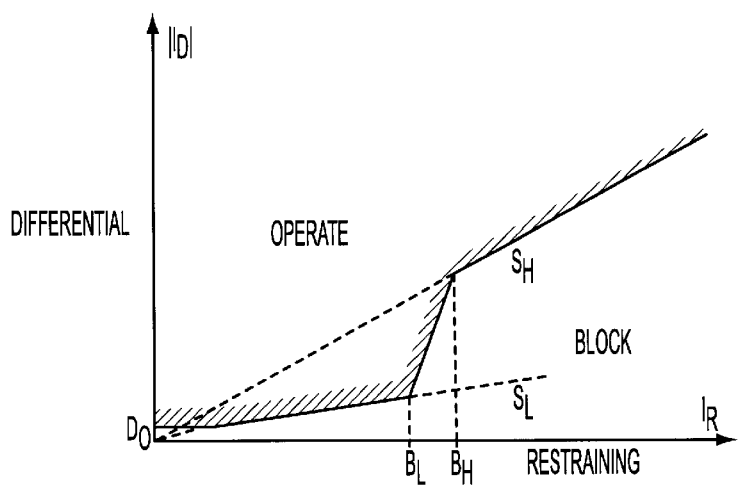
FIG. 3 depicts a two-slope differential characteristic of the method of FIG. 2.
Figure 4:
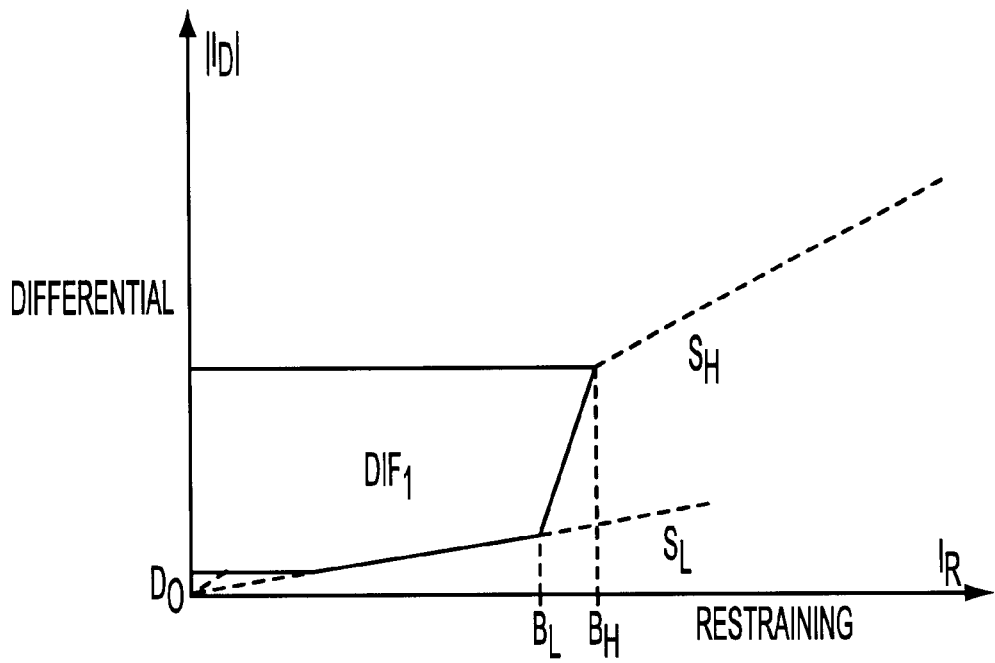
FIG. 4 depicts a lower (fixed) sub-region of the two-slope differential characteristic of the method of FIG. 2.
Figure 5:
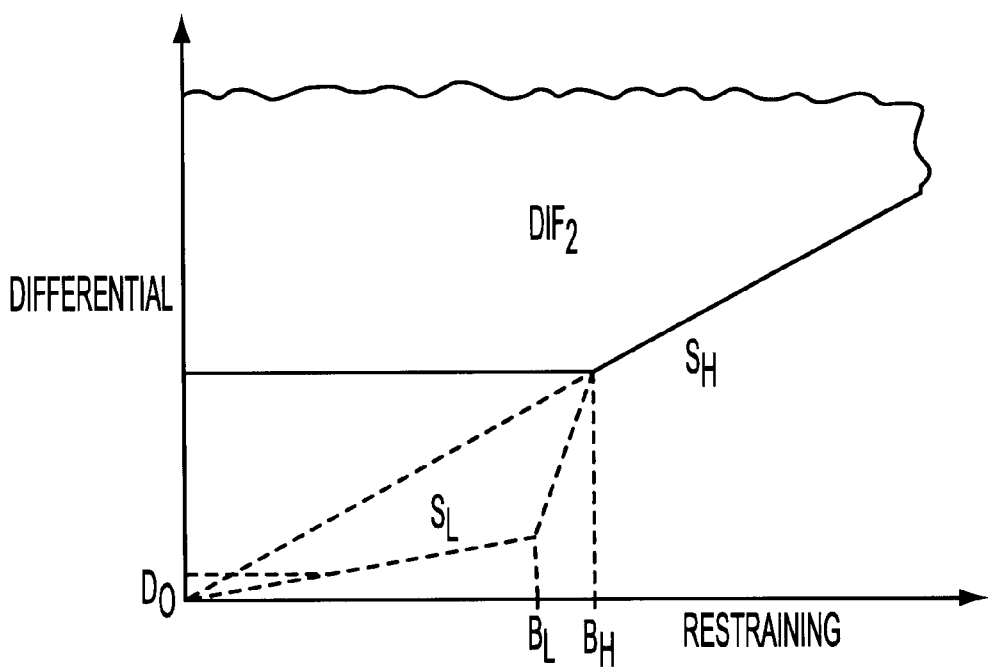
FIG. 5 depicts an upper (dynamic) sub-region of the two-slope differential characteristic of the method of FIG. 2.

In comparator 214, the complete differential characteristic is divided into two sub-regions $DIF_1$ and $DIF_2$ as shown in FIGS. 3–5.

$DIF_1$ is a region of low currents. Saturation of CTs during external faults is difficult to detect if the differential-restraining trajectory homes in on this sub-region. Therefore, if the $(I_D, I_R)$ point is located within $DIF_1$, the bus differential element preferably operates if the directional principle confirms an internal fault (fixed 2-out-of-2 operating mode).

$DIF_2$ is a region of high currents. Saturation of CTs during external faults is detectable if the differential-restraining trajectory homes in on this sub-region. If the $(I_D, I_R)$ point is located within $DIF_2$, the bus differential element preferably operates without support of the directional element only if the saturation detector does not detect CT saturation. If the saturation is detected, the bus differential element operates if the directional principle confirms an internal fault (dynamic 1-out-of-two/2-out-of-2 operating mode).

The shape of the $DIF_1$ sub-region is shown in FIG. 4. Transition between the lower and higher slopes may be approximated either by a straight line or using any conventional smoothing technique.

The DIF 1 sub-region is bounded by the following points on the differential-restraining plane:

$$|I_D| = D_0, \; I_R = 0$$

$$|I_D| = D_0, \; I_R = \frac{D_0}{S_L}$$

$$|I_D| = B_L \cdot S_L, \; I_R = B_L$$

$$|I_D| = B_H \cdot S_H, \; I_R = B_H$$

$$|I_D| = B_H \cdot S_H, \; I_R = 0$$

The $DIF_L$ flag is set as follows by comparator 214:

$$DIF_L = (|I_D| > D_0) \text{AND} (|I_D| > S_L \cdot I_R) \text{AND} \ldots \text{(Inter-breakpoint-condition)} \text{AND} (|I_D| < B_H \cdot S_H) \quad (4a)$$

Equation (4a) is executed every protection pass.

If the straight line approximation of the transition interval between the low and high breakpoints is used, then:

$$\text{Inter-breakpoint-condition} = |I_D| > B_L S_L + (I_R - B_L)\frac{B_H S_H - B_L S_L}{B_H - B_L} \quad (4b)$$

It will be appreciated that the present invention is not restricted to the straight-line approximation (4b), and works well with any shape of the characteristic in the slope-joining interval.

The shape of the $DIF_2$ sub-region is shown in FIG. 5. The $DIF_H$ flag is set as follows:

$$DIF_L = (|I_D| > S_H \cdot I_R) \text{AND} (|I_D| > B_H \cdot S_H) \quad (5)$$

Equation (5) is executed every protection pass.

Figure 6:
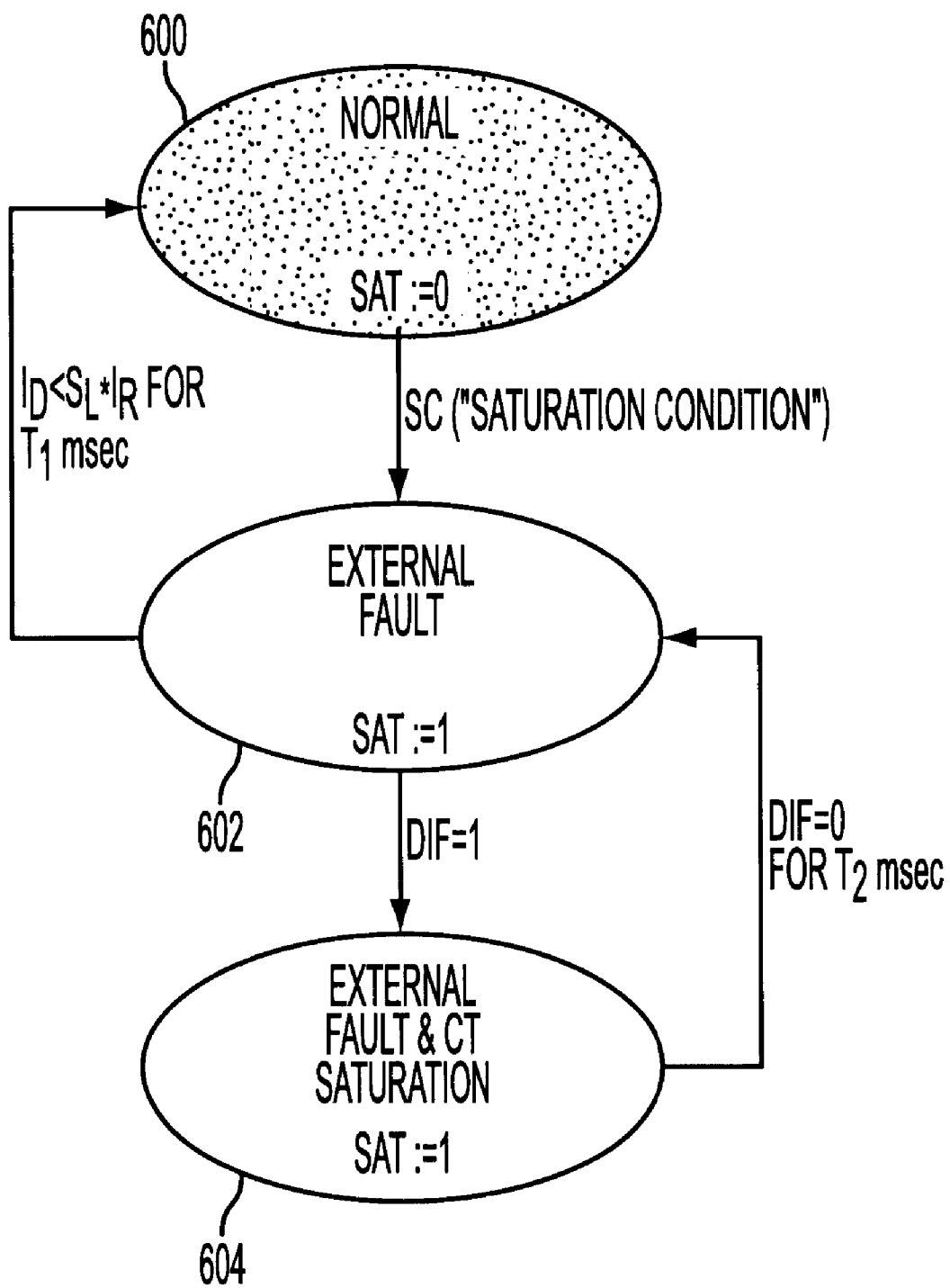
FIG. 6 is a state machine diagram of a saturation detector.

Referring now to FIG. 6, a state diagram of one implementation of the saturation detector 218 is shown. "NORMAL" is the initial state 600 of the state machine. When in the "NORMAL" state the saturation flag is not set (SAT=0).

The saturation condition, SC, is calculated by the algorithm. If SC=1 while the state machine is in the "NORMAL" state, the saturation detector goes into the "EXTERNAL FAULT" state 602 and the saturation flag is set (SAT=1). The algorithm returns to the "NORMAL" state if the differential current is below the first slope, $S_L$, for more than $T_1$ milliseconds. $T_1$ is in one particular application is set at 200 msec.

When in the "EXTERNAL FAULT" state 602 the algorithm goes into the "EXTERNAL FAULT & CT SATURATION" state 604 if the differential flag is set (DIF=1). The differential flag corresponds to the entire differential characteristic (FIG. 3) and is calculated as:

$$DIF = DIF_L \text{ OR } DIF_H \quad (6)$$

When in the "EXTERNAL FAULT & CT SATURATION" state 604, the algorithm keeps the saturation flag set (SAT=1). The state machine returns to the "EXTERNAL FAULT" state 602 if the differential flag is reset (DIF=0) for $T_2$ milliseconds. $T_2$ in one particular application is set at 100 msec.

The saturation condition, SC, is detected using either slow (phasor based) or fast (sample based) path:

$$SC = SC_{slow} \text{ OR } SC_{fast} \quad (7)$$

The slow path checks if the magnitude of the restraining current crosses the higher breakpoint and at the same time the differential current is below the first (lower) slope:

$$SC_{slow} = (|I_D| < S_L \cdot I_R) \text{AND}(I_R > B_H) \quad (8)$$

The fast path detects if the restraining signal develops before the differential signal. In order to detect very fast saturation (occurring after time in the order of a protection pass), the algorithm must look at the current samples.

First, an "instantaneous" differential signal is calculated as:

$$i_D = \left| \sum_{k=1}^{N} i_k \right| \quad (9)$$

Equation (9) is executed every sample.
Next, its "magnitude" is calculated as:

$$M_D = \max_{\text{last-protection-pass (P samples)}} (i_D) \quad (10)$$

where P is a number of samples per protection pass.

Equation (10) is executed every protection pass.

Figure 7:
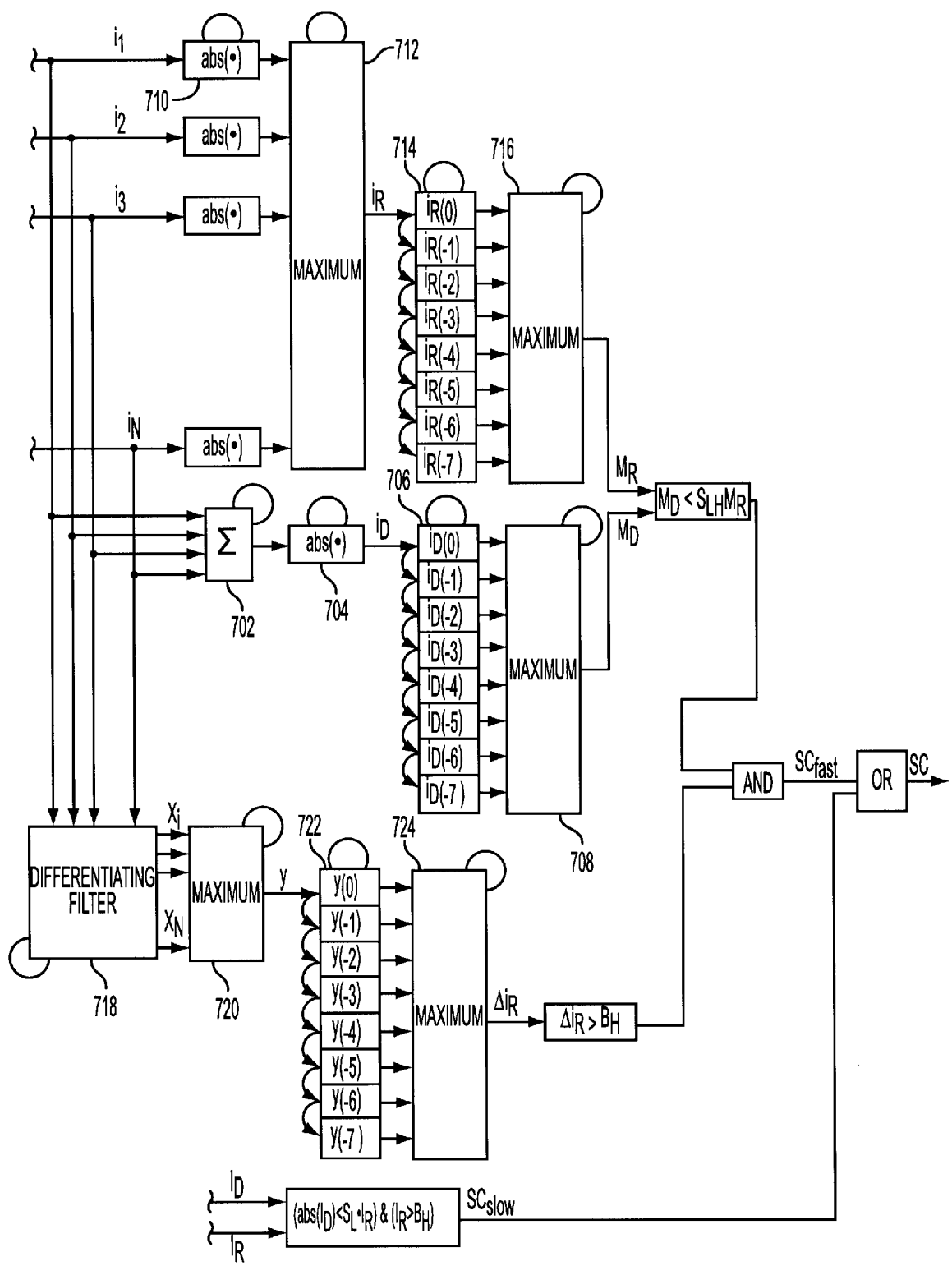
FIG. 7 is a block diagram of the portion of the saturation detector that calculates the saturation condition.

FIG. 7 presents one possible implementation of equations (9) and (10). The current signals are summed (in summer 702) and the absolute value of the sum is computed (in functional block 704). A shifting buffer (706) stores the samples of the differential signal $i_D$ for the time interval of the last protection pass (P samples). The maximum value among those samples (as determined in functional block 708) is the value of $M_D$.

Second, an "instantaneous" restraining signal is calculated as:

$$i_R = \max_{k=1\ldots N} (|i_k|) \quad (11)$$

Equation (11) is executed every sample.
Next, its "magnitude" is calculated as:

$$M_R = \max_{\text{last-protection-pass (P samples)}} (i_R) \quad (12)$$

Equation (12) is executed every protection pass.

With reference to FIG. 7, the absolute values of the instantaneous currents are taken (by functional blocks 710). The maximum value among them is the instantaneous restraining signal $i_R$ (functional block 712). A shifting buffer (functional block 714) stores the samples of the signal $i_R$ for the time interval of the last protection pass (P samples). The maximum value among those samples (as determined in functional block 716) is the value of $M_R$.

Third, a rate of change of an "instantaneous" restraining signal is calculated as:

$$\Delta i_R = \max_{\text{last-protection-pass (P samples)}} (y) \quad (13)$$

Equation (13) is executed every protection pass.
The auxiliary signal y required by equation (13) is calculated as:

$$y = \max_{k=1\ldots N} (|x_k|) \quad (14a)$$

The auxiliary signal x is calculated per each current as a numerical derivative of the current scaled down to have unity gain at the power system frequency:

$$x_{k(m)} = C_1 |3 \cdot i_{k(m)} - 4 \cdot i_{k(m-1)} + k(m-2)| \quad (14b)$$

where:

$$C_1 = 2\sqrt{[1-\cos(a)]^4 + \left(2\sin(a) - \frac{1}{2}\sin(2a)\right)^2}, \quad a = \frac{2\pi}{N_1} \quad (15)$$

Equations (14) are executed for every sample.

With reference to FIG. 7, the differentiating filter given by equation (14b) is applied to all the current signals (functional block 718). The maximum value (as determined in functional block 720) among the outputs x from the filter is fed to a shifting buffer (block 722) that contains the samples of the signal y for the time interval of the last protection pass (P samples). The maximum value among those samples (block 724) is the value of $\Delta i_R$.

Eventually, the fast path of the saturation condition is given as:

$$SC_{fast} = (M_D < S_{LH} \cdot M_R) \text{AND}(\Delta i_R > B_H) \quad (16a)$$

where:

$$S_{LH} = \frac{S_L + S_H}{2} \quad (16b)$$

The saturation condition, SC, is calculated next using equation (7). The SC value controls the state machine shown in FIG. 6.

Referring again to FIG. 2, the directional element 220 checks if the currents of significant magnitudes (as compared with the fault current): flow in one direction (internal fault) or, one of them flows in the opposite direction as compared with the sum of the remaining currents (external fault).

The directional check is preferably performed only for the currents that are fault current "contributors" (as opposed to load currents).

A power system bus is typically connected to a number of circuits, and therefore, during external faults numerous patterns are possible for the fault and load currents. The concept of a "contributor" has been determined to select the currents whose phase relationships are to be checked.

The p-th circuit is a contributor if:

$$|I_k| \geq C_2 \qquad (17a)$$

$$C_2 = \frac{C_3}{N} \cdot I_R \qquad (17b)$$

$C_3$ in one particular application is set at 1.75.

Equation (17a) is executed every protection pass.

By scanning all the currents (circuits) that define the bus differential zone (k=1 . . . N), a list of contributors is built. Depending on the number of connected circuits, short circuit capacities of the connected equivalent systems, and fault location, the number of contributors may vary from 1 (single infeed) to N (internal fault, uniform current distribution).

Two cases can be considered. If the number of contributors equals 1, no further calculations are needed. The output flag is set (DIR=1).

If the number of contributors is greater than 1, for each (p-th) contributor, the following angle is calculated:

$$\varphi_p = \left| angle\left(\frac{I_p}{I_D - I_p}\right) \right| \qquad (18)$$

It is assumed that the "angle" operand returns the angle wrapped to ±180 degrees.

Equation (18) is executed every protection pass.

Figure 8:
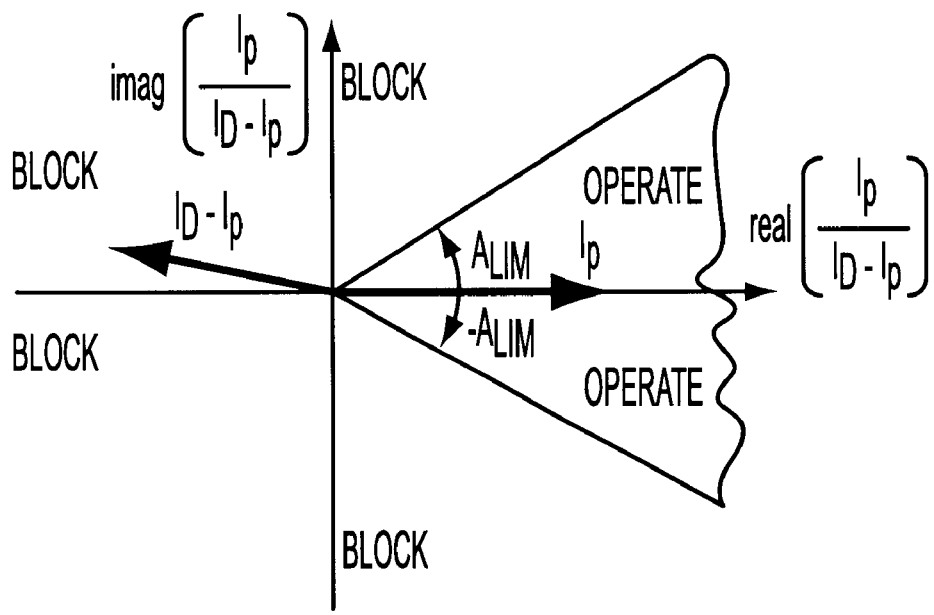
FIG. 8 illustrates operation of the directional principle during external faults.
Figure 9:
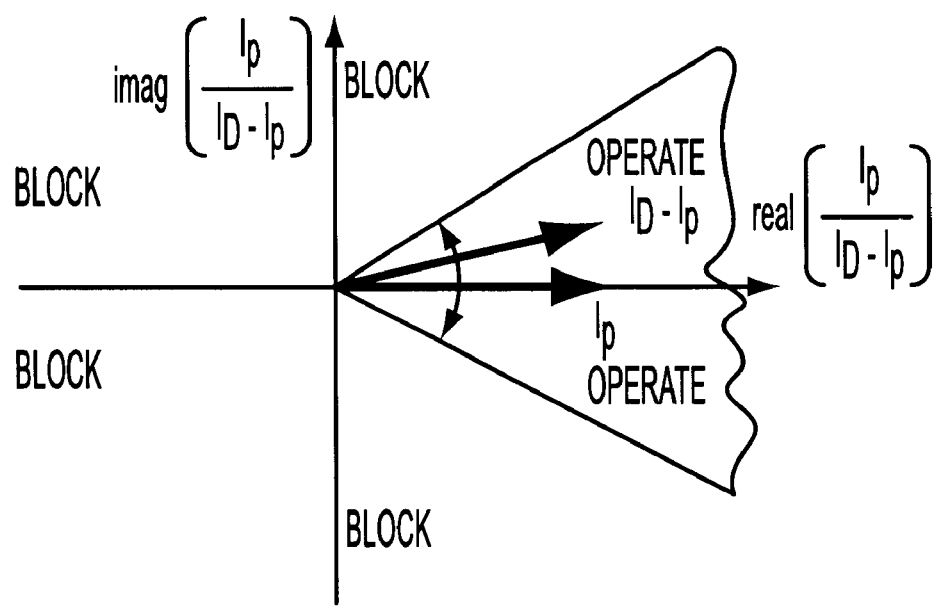
FIG. 9 illustrates operation of the directional principle during internal faults.

FIGS. 8 and 9 illustrate operation of the directional principle for the external and internal fault conditions, respectively.

The directional flag, DIR, is set if:

$$DIR = \max_{all\text{-}contributors} (\varphi_p) < A_{LIM} \qquad (19)$$

Equation (19) is executed every protection pass.

The limit angle $A_{LIM}$ in one particular application is set at the level of about 60–70 degrees.

A security delay of $T_3$ applies to the flag DIR (in one particular application $T_3$ is set at ⅜ of a power cycle).

Figure 10:
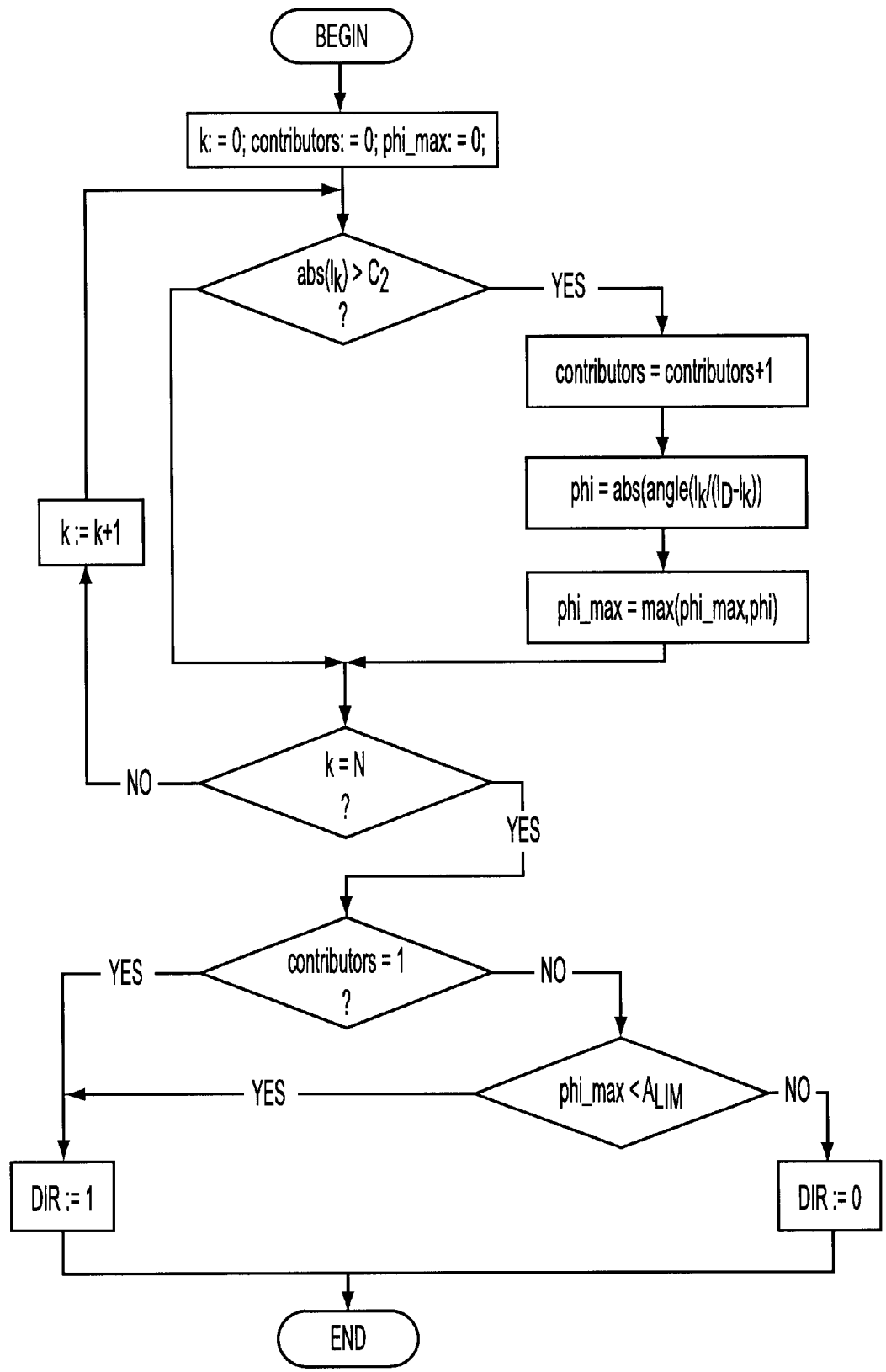
FIG. 10 is a flow chart of a directional part of the method of FIG. 2.

FIG. 10 presents one method which can be implemented by the directional element 220.

Figure 11:
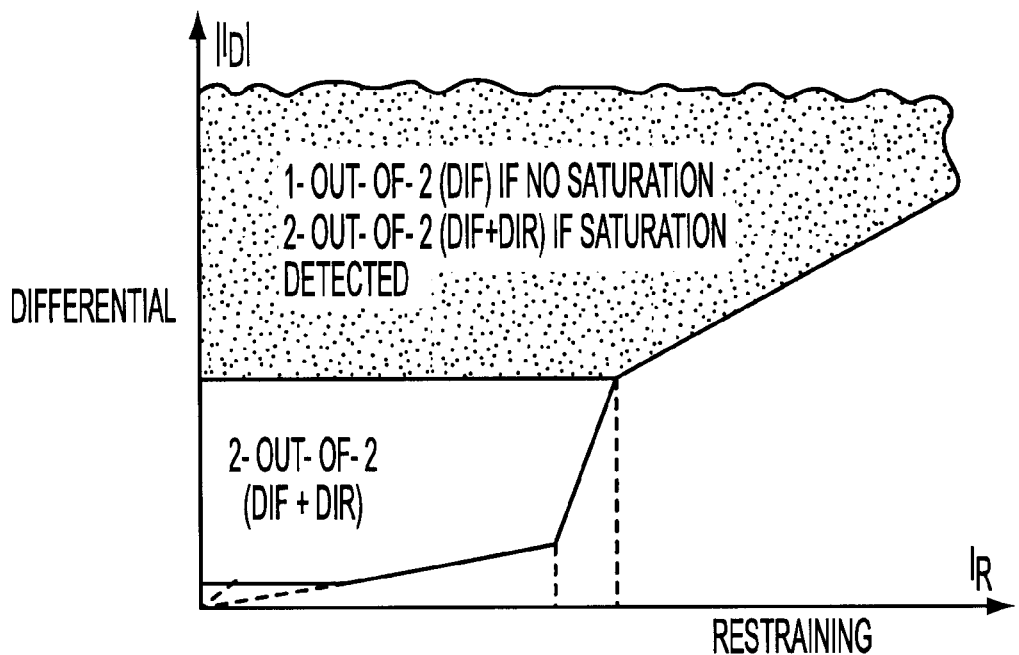
FIG. 11 illustrates the dynamic 1-out-of-2/2-out-of-2 operating modes of the method of FIG. 2.

The bus differential element works dynamically using 1-out-of-2/2-out-of-2 principle as shown in FIG. 11.

Figure 12:
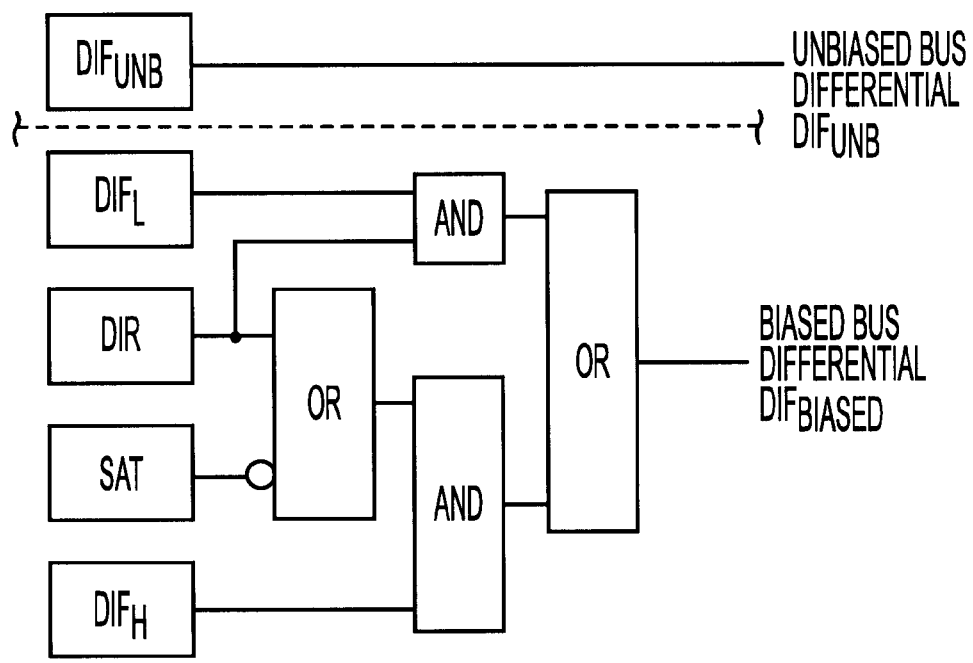
FIG. 12 illustrates an overall logic diagram of the method of FIG. 2.

FIG. 12 presents the logic diagram of the bus differential protection algorithm implemented in the embodiment of FIG. 2.

Figure 13:
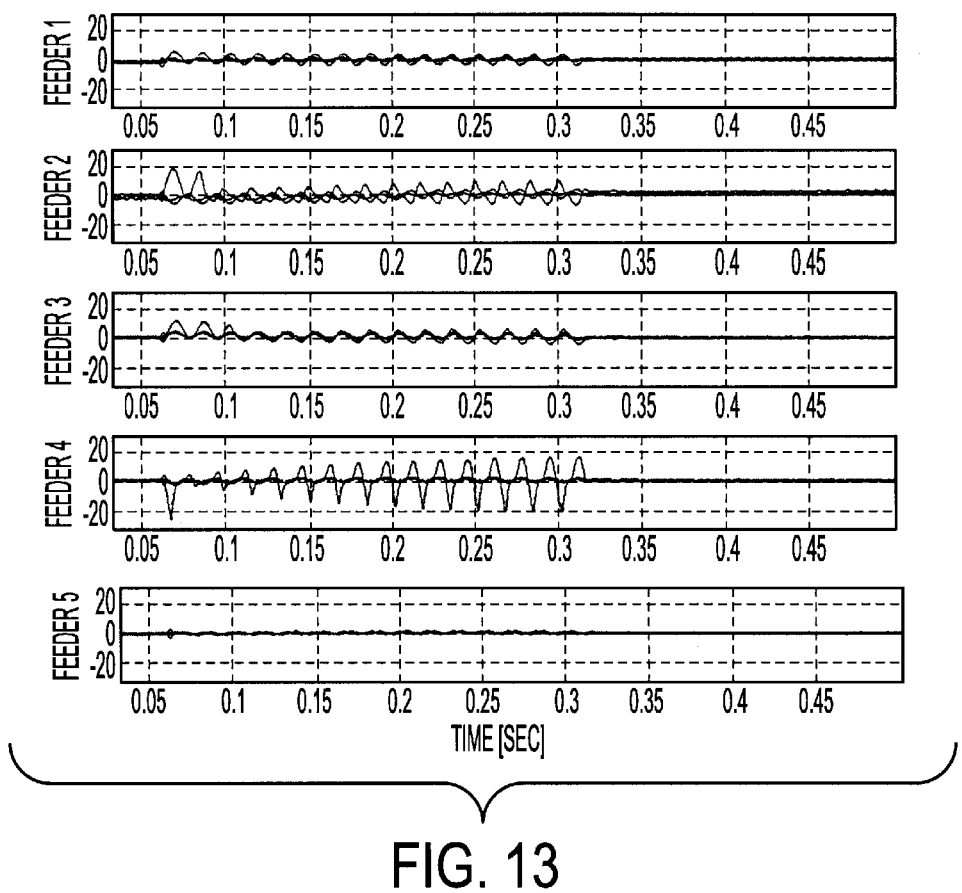
FIGS. 13–17 illustrate operation of the method for a sample external fault with extreme saturation of several CTs.
Figure 14:
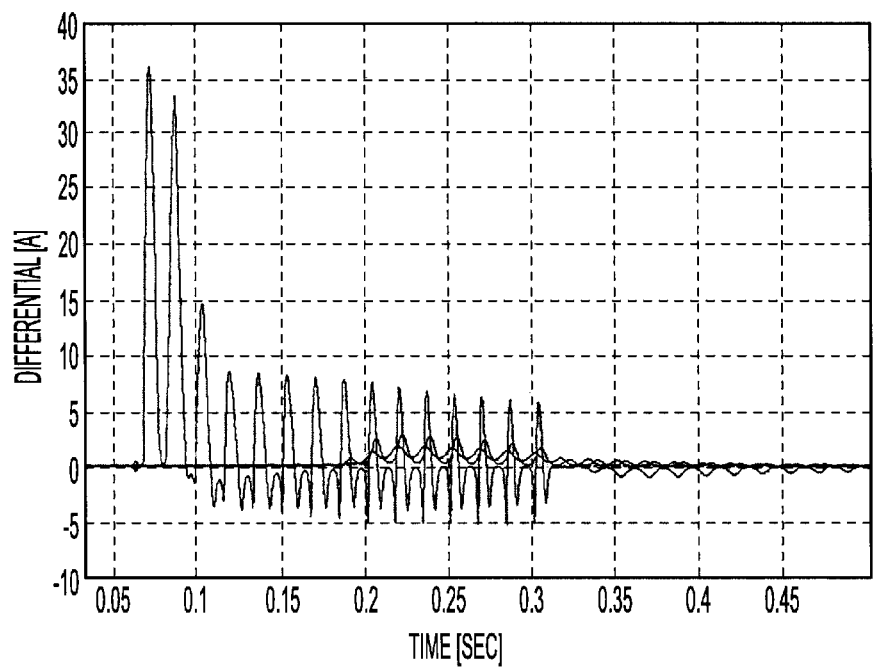
Figure 15:
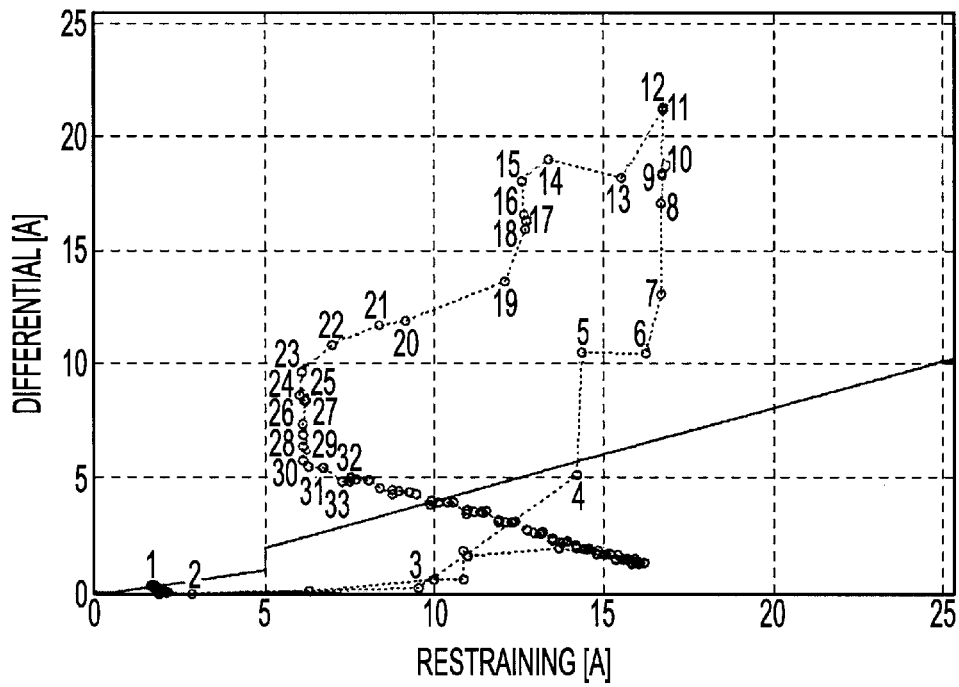
Figure 16:
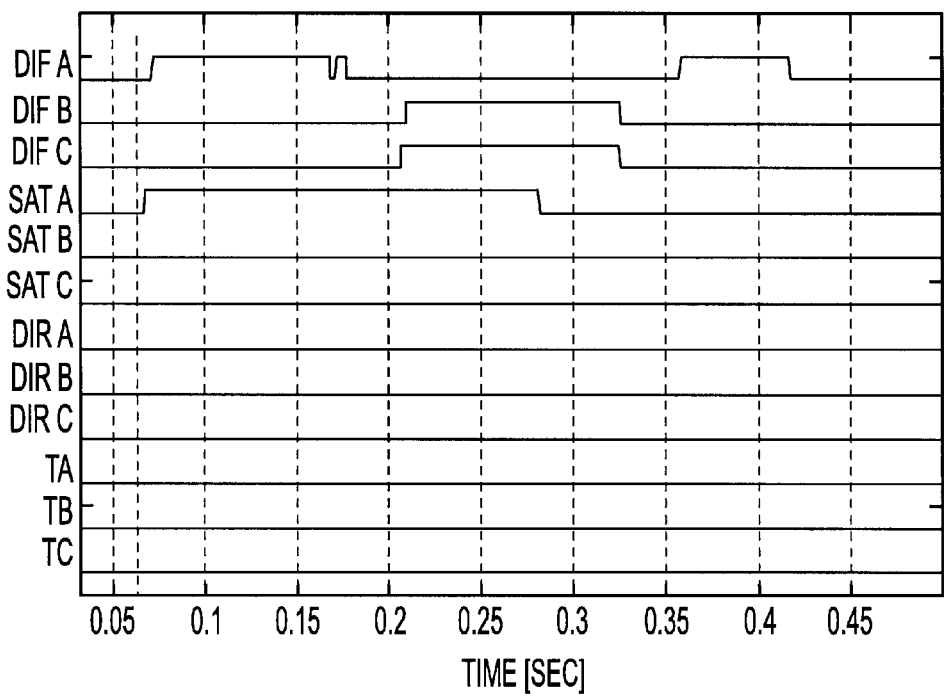
Figure 17:
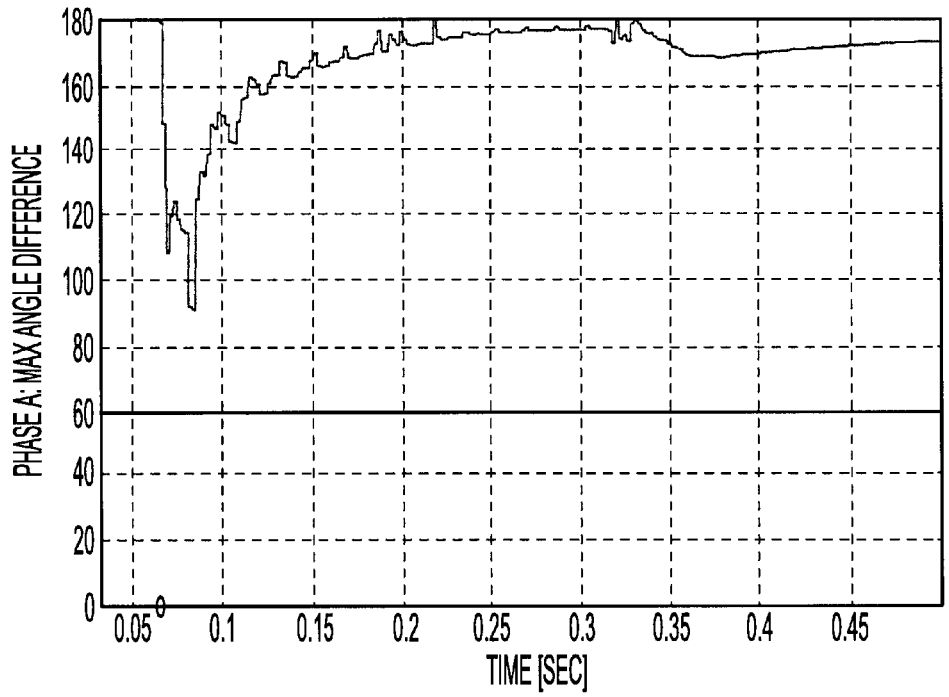

FIG. 13 depicts the input currents for a sample busbar having five feeders attached. The figure shows an external single-line-to-ground fault case (in the phase A) with extremely deep saturation of CTs in feeders 2, 3 and 4. As a result of CT saturation, the spurious differential current becomes very large as shown in FIG. 14. The differential current is so large that the restraining current cannot prevent the differential-restraining locus from entering the differential characteristic (FIG. 15). The classical differential relay would malfunction (FIG. 16, flags DIF). The presented algorithm detects saturation of CTs in the phase A (FIG. 16, flag SAT A) and switches to the 2-out-of-2 operating mode in the phase A. As the directional angle never drops below the 60-deg limit angle (FIG. 17), the DIR flag is not set. Consequently, the relay does not malfunction.

Figure 18:
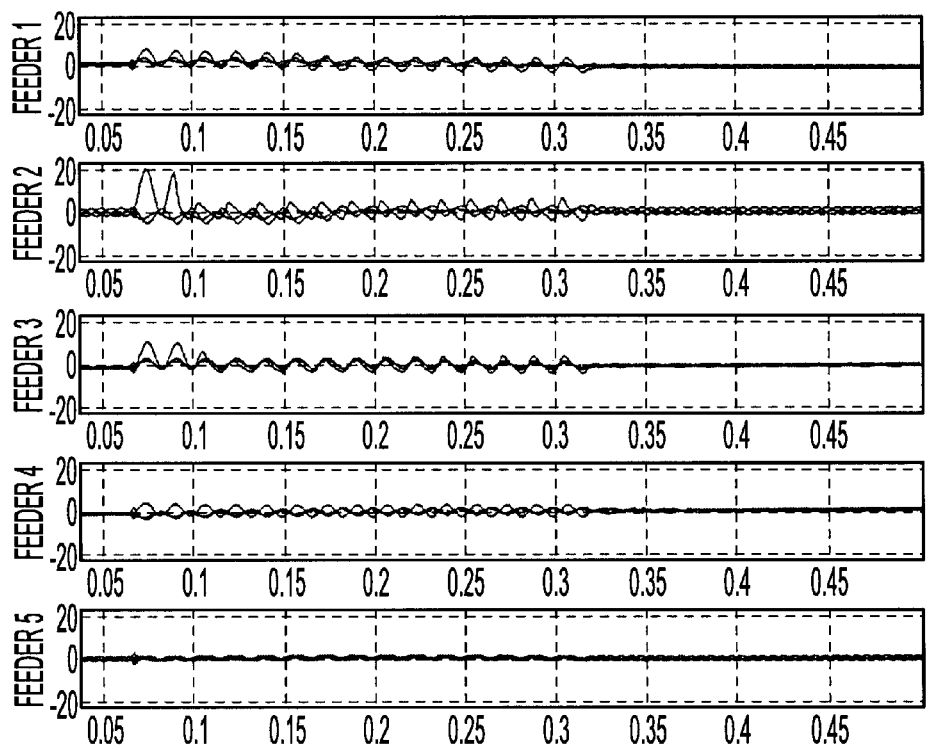
FIGS. 18–19 illustrate operation of the method for a sample internal fault.
Figure 19:
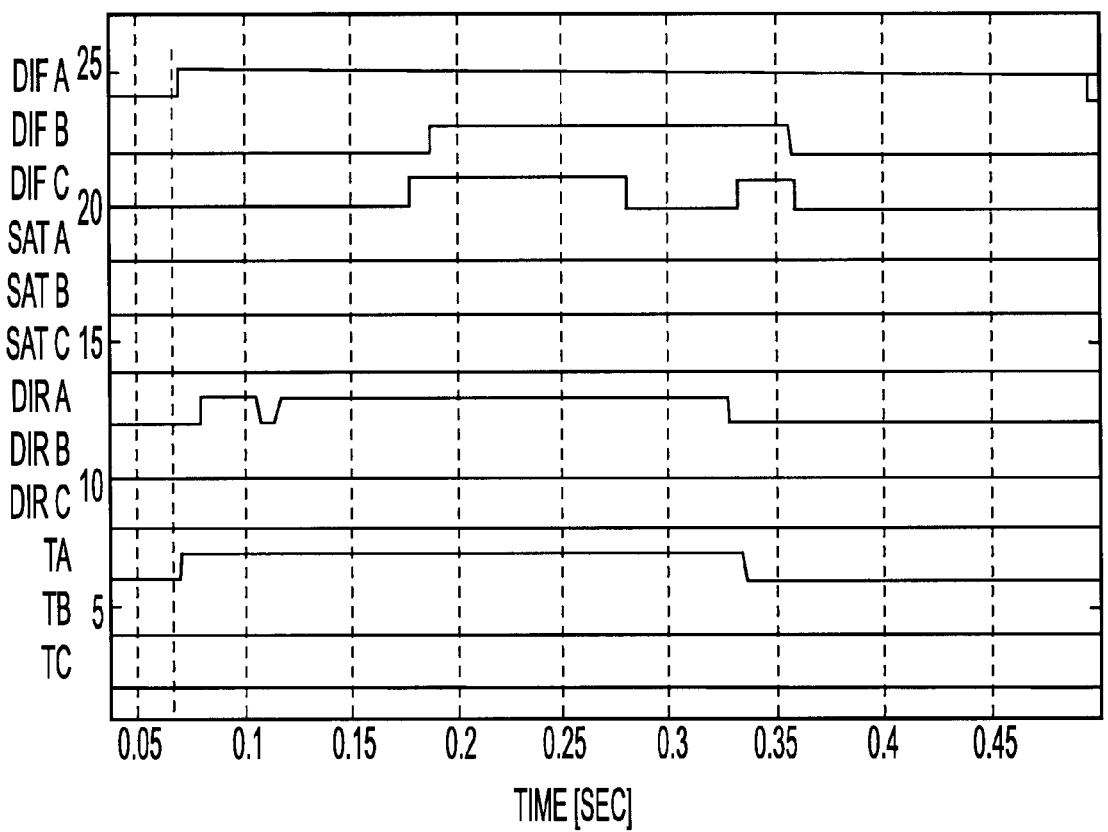

FIG. 18 shows an internal single-line-to-ground fault case (in the phase A) with deep saturation of CTs in feeders 2 and 3. The saturation detector does not trigger despite the saturation of the CTs as it is designed to operate only during external faults saturating the CTs (FIG. 19, flags SAT). The algorithm works using classical differential principle and operates very quickly (FIG. 19, flag TA).

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method for protecting a busbar in a power system, comprising the steps of:

receiving a plurality of input current signals from a plurality of current transformers associated with the power system;

performing a ratio matching of the input current signals;

generating a corresponding plurality of phasor currents from the plurality of ratio-matched current signals;

generating a differential phasor current from the corresponding plurality of phasor currents;

generating a restraining current from a maximum one of the corresponding plurality of magnitudes of phasor currents;

determining, for the combination of the differential phasor current and the restraining current, whether the combination falls in a first range of combination values or a second range of combination values;

determining a directional value based on the corresponding plurality of phasor currents, the differential phasor current, and the restraining current;

determining a saturation condition of one or more of the plurality of current transformers based on the ratio-matched input currents, the differential phasor current, and the restraining current;

initiating a trip command if the combination falls in the first range, the combination indicates the occurrence of a fault, and the directional value indicates the occurrence of a fault;

initiating a trip command if the combination falls in the second range, no saturation is determined, and the combination indicates the occurrence of a fault; and initiating a trip command if the combination falls in the second range, saturation is determined to have occurred, the combination indicates the occurrence of a fault, and the directional value indicates the occurrence of a fault.

2. The method of claim 1, wherein the step of generating is performed by applying a Fourier algorithm to the ratio-matched input current signals.

3. The method of claim 1, further comprising the step of filtering the input currents prior to the step of performing a ratio-matching.

4. The method of claim 1, wherein the first range is bounded by the following values:

$I_D=D_0$, $I_R=0$ $I_D=D_0$, $I_R=D_0/S_L$ $I_D=B_L S_L$, $I_R=B_L$ $I_D=B_H S_H$, $I_R=B_H$ $I_D=B_H S_H$, $I_R=0$ where $I_D$ is the differential phasor current, $I_R$ is the restraining current, $D_0$ is a predetermined threshold value, $B_L$ is a first breakpoint value, $S_L$ is a first slope value, $B_H$ is a second breakpoint value, and $S_H$ is a second slope value.

5. The method of claim 4, wherein the step of determining a saturation condition is performed by determining if a magnitude of the restraining current exceeds the second breakpoint value while the differential phasor current is below the first slope value.

6. The method of claim 4, wherein the step of determining a saturation condition is performed by determining whether the restraining signal is generated prior to the differential current signal.

7. The method of claim 1, wherein the step of determining a directional value is performed by determining whether certain ones of the corresponding plurality of phasor currents flow in a common direction, or whether one of the certain ones flows in a direction opposite to a direction of a sum of the remaining certain ones.

8. The method of claim 7, wherein the certain ones are the phasor currents meeting the condition:

$I_k \geq C_2$, where $C_2=(C_3/N) \times I_R$ where $C_3$ is a predetermined value, N is the number of phasor currents, and $I_R$ is the restraining current.

9. The method of claim 8, wherein $C_3$ is approximately 1.75.

10. The method of claim 7, wherein the number of certain ones is more than one, and wherein the directional value is set by determining, for each of the certain ones, a phase angle defined as $\phi_p$=angle $\{I_p/(I_D-I_p)\}$, and determining whether the maximum phase angle is less than a predetermined threshold limit angle.

11. The method of claim 10, wherein the predetermined threshold limit angle is approximately 60 to 70 degrees.

12. The method of claim 1, wherein the step of generating a differential phasor current is performed by summing the corresponding plurality of phasor currents.

13. The method of claim 1, wherein the method is performed in a microprocessor-based protective relay.

14. A microprocessor-based protective relay, comprising:

a first functional block configured to receive a plurality of input current signals, the first functional block performing a ratio matching of the plurality of input current signals;

a second functional block configured to receive the plurality of ratio-matched input current signals and to apply a Fourier algorithm to generate a corresponding plurality of phasor currents;

a summer configured to receive the corresponding plurality of phasor currents and to generate a differential phasor current;

a third functional block configured to receive the corresponding plurality of phasor currents and to determine a restraining current from a maximum one of the phasor currents;

one or more combinatorial blocks configured to receive the restraining current and the differential phasor current and to determine whether the combination falls in a first range of combination values or a second range of combination values;

a directional element configured to receive the corresponding plurality of phasor currents, the differential phasor current, and the restraining current, the directional element determining a directional value indicative of the occurrence of a fault on the power system;

a saturation detector configured to receive the plurality of ratio-matched input current signals, the differential phasor current, and the restraining current, the saturation detector determining a saturation condition of one or more current transformers associated with the power system;

logic configured to receive the outputs of the combinatorial blocks, the directional element, and the saturation detector, the logic generating a trip control signal:

if the combination falls in the first range, the combination indicates the occurrence of a fault, and the directional value indicates the occurrence of a fault;

if the combination falls in the second range, no positive saturation condition is determined, and the combination indicates the occurrence of a fault; or if the combination falls in the second range, a positive saturation condition is determined, the combination indicates the occurrence of a fault, and the directional value indicates the occurrence of a fault.

15. The relay of claim 14, further comprising a filter configured to receive the input current signals and to output filtered input current signals to the first functional block.

16. The relay of claim 14, wherein the first range is bounded by the following values:

$I_D=D_0$, $I_R=0$ $I_D=D_0$, $I_R=D_0/S_L$ $I_D=B_L S_L$, $I_R=B_L$ $I_D=B_H S_H$, $I_R=B_H$ $I_D=B_H S_H$, $I_R=0$ where $I_D$ is the differential phasor current, $I_R$ is the restraining current, $D_0$ is a predetermined threshold value, $B_L$ is a first breakpoint value, $S_L$ is a first slope value, $B_H$ is a second breakpoint value, and $S_H$ is a second slope value.

17. The relay of claim 16, wherein the saturation detector is configured to determine if a magnitude of the restraining current exceeds the second breakpoint value while the differential phasor current is below the first slope value.

18. The relay of claim 17, wherein the saturation detector is configured to determine whether the restraining signal is generated prior to the differential current signal.

19. The relay of claim 14, wherein the directional element determines whether certain ones of the corresponding plurality of phasor currents flow in a common direction, or whether one of the certain ones flows in a direction opposite to a direction of a sum of the remaining certain ones.

20. The relay of claim 19, wherein the certain ones are the phasor currents meeting the condition:

$I_k \geq C_2$, where $C_2=(C_3/N) \times I_R$ where $C_3$ is a predetermined value, N is the number of phasor currents, and $I_R$ is the restraining current.

21. The relay of claim 20, wherein $C_3$ is approximately 1.75.

22. The relay of claim 19, wherein the number of certain ones is more than one, and wherein the directional value is set by determining, for each of the certain ones, a phase angle defined as $\phi_p$=angle $\{I_p/(I_D-I_p)\}$, and determining whether the maximum phase angle is less than a predetermined threshold limit angle.

23. The relay of claim 22, wherein the predetermined threshold limit angle is approximately 60 to 70 degrees.

24. The relay of claim 14, wherein the summer generates a differential phasor current by summing the corresponding plurality of phasor currents.

25. A storage medium encoded with machine-readable instructions, comprising:

one or more instructions for receiving a plurality of input current signals from a plurality of current transformers associated with the power system;

one or more instructions for performing a ratio matching of the input current signals;

one or more instructions for generating a corresponding plurality of phasor currents from the plurality of ratio-matched current signals;

one or more instructions for generating a differential phasor current from the corresponding plurality of phasor currents;

one or more instructions for generating a restraining current from a maximum one of the corresponding plurality of phasor currents;

one or more instructions for determining, for the combination of the differential phasor current and the restraining current, whether the combination falls in a first range of combination values or a second range of combination values;

one or more instructions for determining a directional value based on the corresponding plurality of phasor currents, the differential phasor current, and the restraining current;

one or more instructions for determining a saturation condition of one or more of the plurality of current transformers based on the ratio-matched input currents, the differential phasor current, and the restraining current;

one or more instructions for initiating a trip command if the combination falls in the first range, the combination indicates the occurrence of a fault, and the directional value indicates the occurrence of a fault;

one or more instructions for initiating a trip command if the combination falls in the second range, no saturation is determined, and the combination indicates the occurrence of a fault; and one or more instructions for initiating a trip command if the combination falls in the second range, saturation is determined to have occurred, the combination indicates the occurrence of a fault, and the directional value indicates the occurrence of a fault.

26. The medium of claim 25, further comprising one or more instructions for filtering the input signals prior to performing the ratio-matching.

27. The medium of claim 25, wherein the one or more instructions for generating the corresponding plurality of phasor currents applies a Fourier algorithm to the ratio-matched input currents.

28. The medium of claim 25, wherein the first range is bounded by the following values:

$I_D=D_0$, $I_R=0$
$I_D=D_0$, $I_R=D_0/S_L$
$I_D=B_L S_L$, $I_R=B_L$
$I_D=B_H S_H$, $I_R=B_H$
$I_D=B_H S_H$, $I_R=0$ where $I_D$ is the differential phasor current, $I_R$ is the restraining current, $D_0$ is a predetermined threshold value, $B_L$ is a first breakpoint value, $S_L$ is a first slope value, $B_H$ is a second breakpoint value, and $S_H$ is a second slope value.

29. The medium of claim 28, wherein the one or more instructions for determining a saturation condition include determining if a magnitude of the restraining current exceeds the second breakpoint value while the differential phasor current is below the first slope value.

30. The medium of claim 28, wherein the one or more instructions for determining a saturation condition include determining whether the restraining signal is generated prior to the differential current signal.

31. The medium of claim 25, wherein the one or more instructions for determining a directional value include determining whether certain ones of the corresponding plurality of phasor currents flow in a common direction, or whether one of the certain ones flows in a direction opposite to a direction of a sum of the remaining certain ones.

32. The medium of claim 31, wherein the certain ones are the phasor currents meeting the condition:

$I_k \geq C_2$, where $C_2=(C_3/N) \times I_R$, where $C_3$ is a predetermined value, N is the number of phasor currents, and $I_R$ is the restraining current.

33. The medium of claim 32, wherein $C_3$ is approximately 1.75.

34. The medium, of claim 31, wherein the number of certain ones is more than one, and wherein the directional value is set by determining, for each of the certain ones, a phase angle defined as $\phi_p$=angle $\{I_p/(I_D-I_p)\}$, and determining whether the maximum phase angle is less than a predetermined threshold limit angle.

35. The medium of claim 34, wherein the predetermined threshold limit angle is approximately 60 to 70 degrees.

36. The medium of claim 25, wherein the one or more instructions for generating a differential phasor current include summing the corresponding plurality of phasor currents.

37. The medium of claim 25, wherein the instructions are formatted to be read and executed by a microprocessor-based protective relay.

* * * * *